METHOD OF CONSTRUCTION FOR MAGNETIC CORE

Original Filed Aug. 14, 1952 5 Sheets-Sheet 1

INVENTORS
SAMUEL HORELICK &
JOHN J. ZIMSKY
by HOOPES, LEONARD & GLENN
their attys.

INVENTORS
SAMUEL HORELICK &
JOHN J. ZIMSKY
by HOOPES, LEONARD & GLENN
their attys Dec. 13, 1960 S. HORELICK ET AL 2,963,776

METHOD OF CONSTRUCTION FOR MAGNETIC CORE

Original Filed Aug. 14, 1952 5 Sheets-Sheet 3

INVENTORS
SAMUEL HORELICK &
JOHN J. ZIMSKY
by HOOPES, LEONARD & GLENN
their attys.

INVENTORS
SAMUEL HORELICK &
JOHN J. ZIMSKY
by HOOPES, LEONARD & GLENN
their attys.

METHOD OF CONSTRUCTION FOR MAGNETIC CORE

Original Filed Aug. 14, 1952 5 Sheets-Sheet 5

INVENTORS
SAMUEL HORELICK &
JOHN J. ZIMSKY
by HOOPES, LEONARD & GLENN
their attys United States Patent Office 2,963,776
Patented Dec. 13, 1960

2,963,776

METHOD OF CONSTRUCTION FOR MAGNETIC CORE

Samuel Horelick, Pittsburgh, and John J. Zimsky, Canonsburg, Pa., assignors to McGraw-Edison Company, a corporation of Delaware Original application Aug. 14, 1952, Ser. No. 304,346. Divided and this application Apr. 18, 1956, Ser. No. 582,315
6 Claims. (Cl. 29—155.57)

This invention relates to a method of constructing magnetic cores of the wound shape for transformers or the like. More particularly, it relates to a method for constructing magnetic cores for larger various sizes of transformers and the like employing relatively interchangeable or standardized corner parts and to a method for making such corner parts.

This application is a division of our parent application, Serial No. 304,346, filed August 14, 1952, entitled "Wound Type Core for a Transformer or the Like," now abandoned. A continuation of our parent application having the same title and filed on October 25, 1956, Serial No. 620,784, issued on October 13, 1959, as U.S. Patent 2,908,879.

In the art of transformer and similar cores, it is usual to use either hot rolled or cold rolled ferromagnetic strip material such as oxide coated silicon steel for the core metal. Further, it is usually desirable to produce such cores from core steel so that the flow of magnetic flux is in the direction in which the core steel has been rolled. In order to minimize core loss, particularly at the corners of the cores, the art has frequently turned to the use of wound-type cores in which the bent laminations are generally parallel to the axis of the window of the core and tangent to the winding turns. These wound-type cores avoid the usual difficulty at the corners inherent in the construction and use of laminated-type cores in which the flat laminations are generally normal to the axis of the core window. However, it has not usually been considered practicable to produce wound-type cores for transformers, such as power transformers, and the like, having relatively higher kva. ratings.

In this invention, a wound-type core can be produced economically for such power transformers of relatively higher kva. ratings and the like, thereby retaining the other advantages of such wound-type cores for the larger equipment. Moreover, by means of this invention, the corner pieces of the respective laminations are so constructed that wound-type cores of any of many different sizes and dimensions may be made therefrom. In this way, and to such extent, there is a desirable standardization of parts. Further, for cores of given dimensions, the straight reaches or parts of the laminations extending between the corner parts are substantially equal in length in each side and on opposite sides of any of the new cores. As a consequence, a variety of transformers and the like of different ratings and sizes may be assembled by relatively unskilled workmen using a minimum stock of lamination parts for said cores.

Other objects and advantages will be apparent from the following description, and from the drawings which are diagramamtic only, in which, Figure 1 is a view in front elevation of a coil of wound ferromagnetic strip to be used in one fabrication of corner parts for cores for transformers or the like in accordance with the teachings of this invention;

Figure 9:
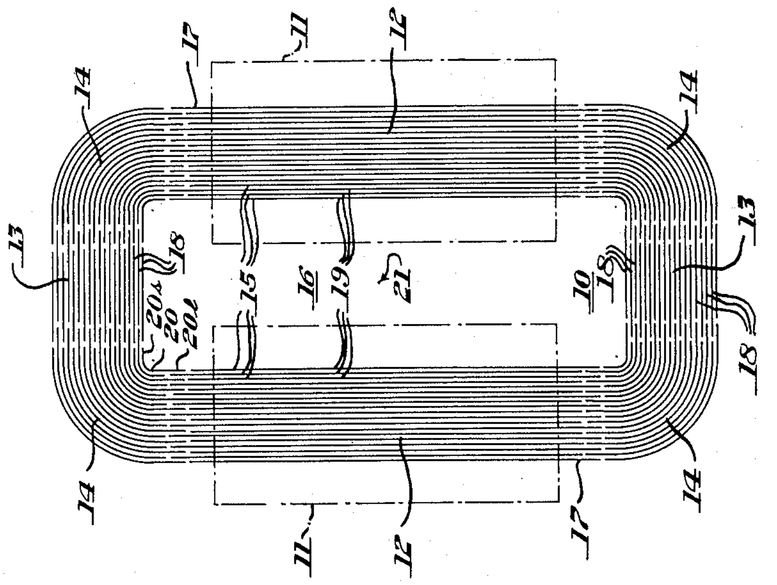
Figure 9 is a schematic view in front elevation showing the core of Figure 8 completed with the employment of two further quadrantal sections for the upper two corners thereof.
Figure 8:
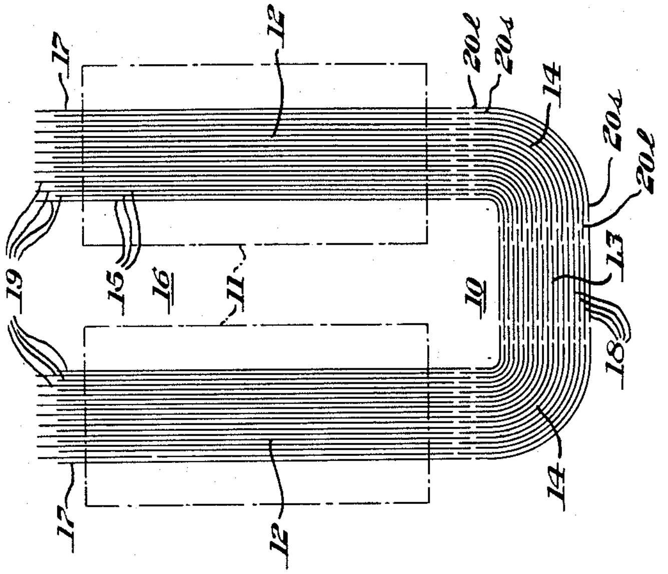
Figure 8 is a schematic view showing the assembly of a lower portion of a transformer core made in accordance with this invention using two of said quadrantal sections for the two lower corners thereof with a conductive winding surrounding each of the core-winding legs above said corners.

As shown in Figure 9, a new core 10 is provided for the conductive windings 11, each of which may comprise a single winding or a plurality of windings of conventional nature. Such windings will usually be preformed before assembly with core 10. In constructing such a transformer assembly with preformed windings 11, as shown in Figure 8, the lower portion of core 10 is constructed and the windings 11 positioned thereon prior to the completion of the core by adding the upper portion thereof as shown in Figure 9. The terms "lower" and "upper" are relative inasmuch as the cores of this invention, as is the case with other transformer cores, may be used in vertical or horizontal or other desired position.

Core 10 will usually be made of conventional closed generally rectangular shape having a pair of opposite, substantially straight, parallel winding legs 12 which usually are placed in a vertical or horizontal position. Either one or both legs 12 may actually be used as a winding leg and be linked by passing through the window of a winding 11. Thus, in the transformer illustrated in Figure 9, each of the winding legs 12 is linked with at least one winding 11. On the other hand, in the modified core type of transformer diagrammatically shown in Figure 12, in which the cores 10' may each be made in accordance with this invention, only one of the winding legs 12' of each of the cores 10' is linked to a winding 11'. The other or outer winding legs 12'' of the side-by-side cores 10' in the Figure 12 structure do not pass through any winding.

In core 10, the winding legs 12 are yoked by the opposite spaced parallel sides 13 completing the four sides of the generally rectangular core shape. These sides 13 may be referred to as the horizontal sides of yoke legs of a core 10 in the upper and lower portion of the core when the core is vertical.

Core 10 is constructed with four quadrantal corner sections 14 which may be made as shown in Figures 1 to 7, inclusive. Since the quadrantal corner sections 14 are the corners of core 10 and usually have the same number of laminar pieces of ferromagnetic strip as the adjoining straight sections of core 10 in the legs 12 and 13, core 10 comprises a plurality of single closed concentric rectangular laminations or turns 15 extending from the edge of the window 16 in the core to the outer edge of periphery 17 of the core. Each lamination 15 comprises straight strips or pieces 18 of ferromagnetic material in the legs 13 and straight strips or pieces 19 of ferromagnetic material in the legs 12. The adjoining straight pieces 18 and 19 are each connected to complete the magnetic circuit turn by an arcuate or curved corner piece 20. Each corner piece 20 is a piece of core steel strip in the shape of an angle having a longer side 20*l* and a shorter side 20*s* with an included dihedral angle between said sides 20*l* and 20*s* of approximately 90°. In some cases, it may be desirable to form the laminations of the lower portion illustrated in Figure 8 out of single U-shaped members.

Although the corner pieces 20 and the corner sections 14 are generally quadrantly arcuate, such corners 14 may equally well be made in the form of nested relatively sharp right angles of core steel strip which might be made in a variety of ways. Thus, a progressive length shearing machine might be employed to make successive lengths of strip each of which might be automatically bent into a sharp right-angle at the appropriate location along each piece of strip to provide, when assembled with the other bend strips, a corner having the new characteristics described in connection with the quadrantal corners 14.

Each of the corner pieces 20 makes two butt joints with the adjoining ends of the adjoining straight pieces 18 and 19 respectively. Thus, in the upper left-hand portion of Figure 9, side 20*l*, which on the innermost lamination 15 extends vertically downwardly, abuts the upper end of straight piece 19 on that side of core 10 and the side 20*s* of the same corner piece 20 makes a butt joint with the left-hand end of the upper innermost straight piece 18. Moving outwardly from the axis 21 of window 16, which axis is normal to the surface of the drawing, the long sides 20*l* of the corner pieces in each quadrantal section 14 are staggered, that is, the long sides 20*l* of successive pieces 20 are on opposite sides of a plane bisecting the included angles of those pieces. Further, in each turn 15, the sides 20*l* of the respective corner pieces 20 extend in the same rotational direction about axis 21. By this means, the respective butt joints in successive laminations 15 are staggered or offset relative to the corresponding joints on adjoining laminations 15 to the extent approximately of the difference between the lengths of the respective sides of the respective corner pieces 20 in that lamination.

Since the corners 14 will usually be alike and the corner pieces in each corner 14 are substantially quadrantal relative the other corner pieces in the same corner, all of the straight pieces 18 may be made of the same length for any core to be provided with the same yoke width between the winding leg sides 12 of the core. Likewise, all of the straight pieces 19 for all of the laminations 15 are equal in length, not only for the given core, but for any other core to be provided with the same winding leg height between the yoke leg sides 13 of the core. Whenever both height and width of a core made in general accord with core 10 is to be changed, respective straight pieces corresponding in purpose to straight pieces 18 and 19 and in size to the desired changed dimensions, may be provided for use with similar or identical quadrantal corners 14 to readily enable the new size of core to be made.

Since the straight lamination pieces can very readily be made on the usual shearing and/or slitting machines from ferromagnetic steel strip of the appropriate width and thickness, the practice of this invention immediately provides a means for making a wide range of transformers and the like of relatively higher ratings such as power transformers of 500 kva. and over, by the use of a stock of relatively few sizes of straight pieces and the use of curved quadrantal corners of corresponding width and thickness. When any entire core made in accordance with this invention has a corresponding number of turns of the same width and gauge, the quadrantal corner sections of that width and gauge of metal will serve for an even increased number of different sizes of the new cores.

Figures 10, 11, 12:
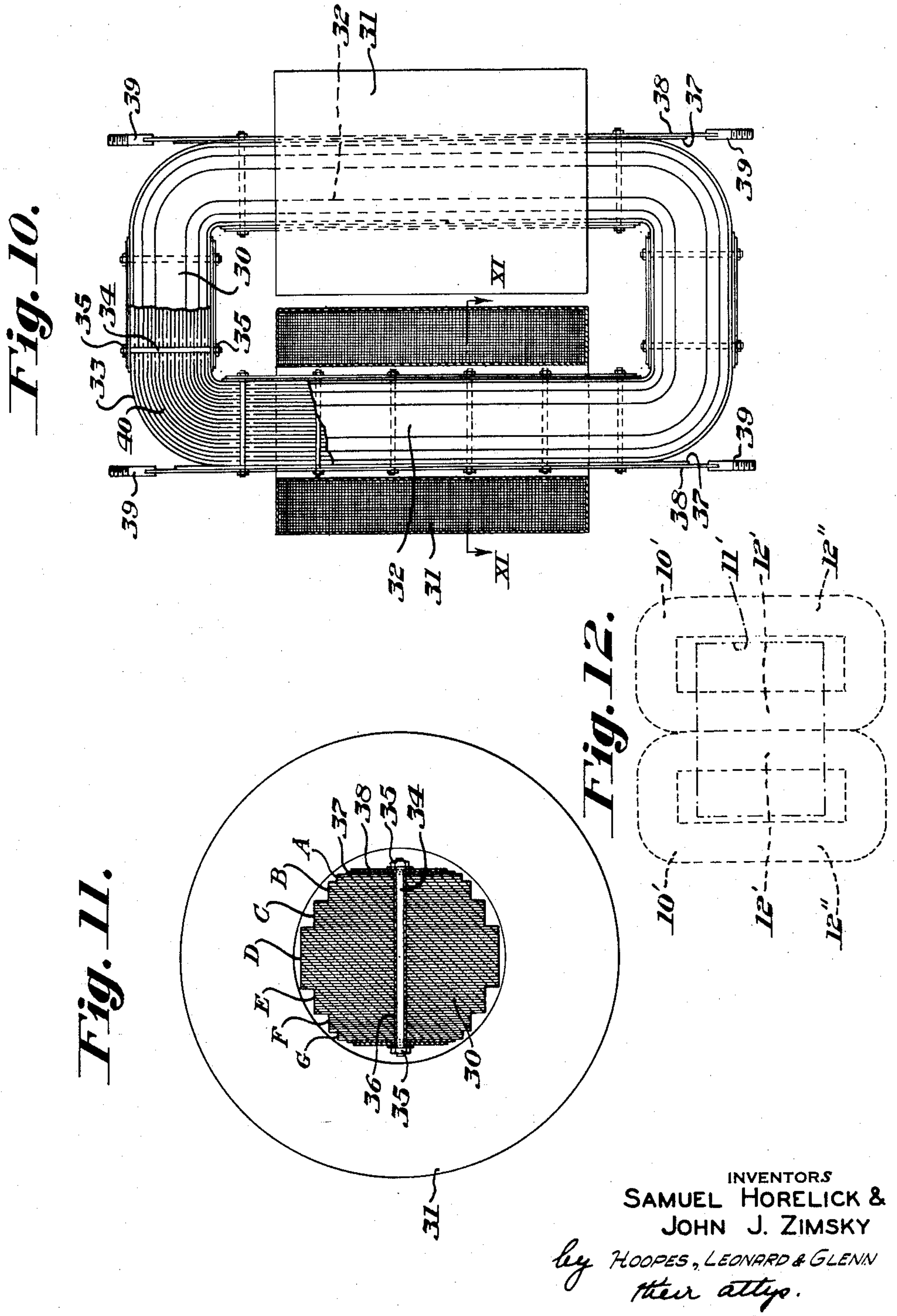
Figure 10 is a view in front elevation of a substantially completed power transformer embodying a core of generally cruciform cross section made in accordance with this invention.
Figure 11 is a view in cross section taken substantially along line XI—XI of Figure 10.
Figure 12 is a schematic view of a modified shell type transformer utilizing two cores made in accordance with this invention.

The teachings of this invention can be used in the construction of new cores having a generally cruciform shape such as is illustrated in Figure 11, the corners of which may be made as shown in Figures 1 to 7. The employment of cores which are cruciform in cross section is in and of itself an old expedient to obtain a more efficient space factor. The new core 30 of this invention which is illustrated in Figures 10 and 11 has the same physical structure substantially as core 10 of Figures 8 and 9 except that core 10 may be made of a uniform width of core strip. Core 30 is similarly linked with windings 31 through the windows of which winding legs 32 pass. The stepwise lateral variation of the width of the strip required to make successive concentric laminations 33 for core 30, as shown in Figure 11, is the chief physical difference in construction from any core 10 in which substantially all of the laminations 15 thereof are substantially equal in width from edge to edge.

In order to hold the respective parts of the cores of this invention together, a variety of conventional means may be employed. Thus, in the case of core 30, the laminations 33 are bolted together around the entire periphery of the core by bolts 34 extending completely through the laminations and cooperating with nuts 35 which threadably engage the respective bolts. Each of the bolts 34 is insulated by an insulating sleeve 36 where it passes through the laminations. Further, as shown in Figure 10, the corners 40 may be locked in the completed new core by a bolt 34 passing through a drilled opening near the edge of the longer sides of the corner pieces in registry with a similar opening in the straight pieces interleaved with such longer sides. In general, the shorter sides of the respective corner pieces are adequately held in the final assembly by the frictional pressure exerted on each shorter side by the longer sides of the adjoining corner pieces in the same corner. It will be noted that in each corner the respective edges of the respective corner pieces are generally in respective planes, the planes being preferably normal to the side of the core in which the ends of the corner pieces lie, and, such planes at the ends of a single corner on adjoining sides of the core being generally at right angles. An insulating spacer 37 fits tightly against the sides of the innermost and outermost laminations to insulate them from the steel straps 38 between the respective pairs of which the laminations are clamped along each side thereof by the respective bolts 34 and nuts 35. The outermost straps 38 along the outside of the winding legs 32 are provided with stud ends 39 for mounting in the transformer frame. Moreover, the windings 31 are blocked up in immovable relation to winding legs 32 and the rest of core 30 in conventional manner so that neither the mechanical nor electrical stresses encountered will shift any part of the transformer or of the new core therein. The respective bolts 34 and nuts 35 not only hold the pieces in each lamination and the respective laminations in cooperating relationship but also clamp successive laminations tightly together to effect an efficient magnetic flux cross-over relationship between successive lamination turns 33, particularly across the respective butt joint areas of each lamination.

Figure 1:
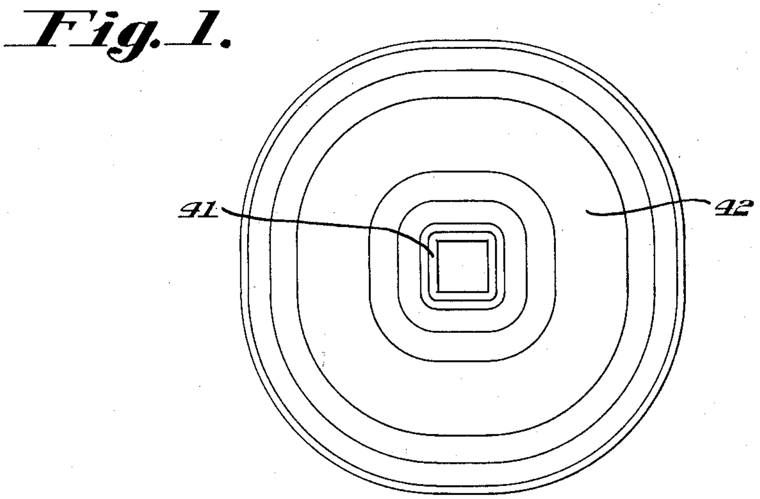
Figure 2:
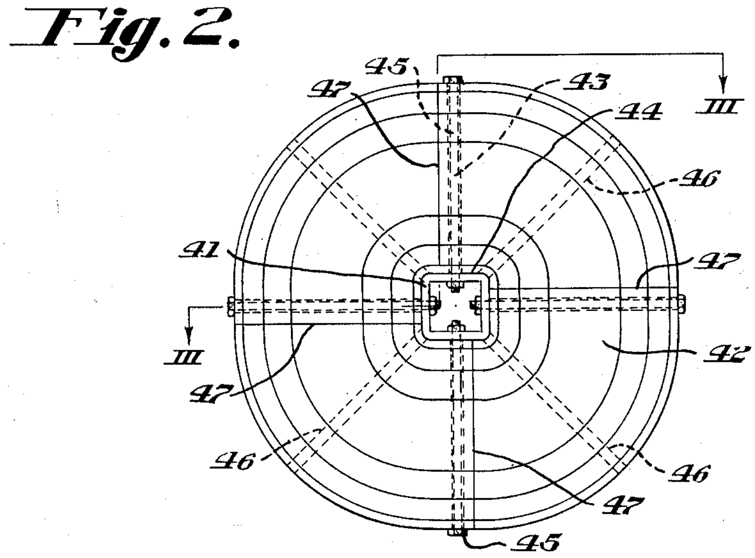
Figure 2 is a view in front elevation of the coil shown in Figure 1 showing the coiling mandrel, a mode of fastening the coil thereto, which coil has been drilled in the indexing positions.
Figure 3:
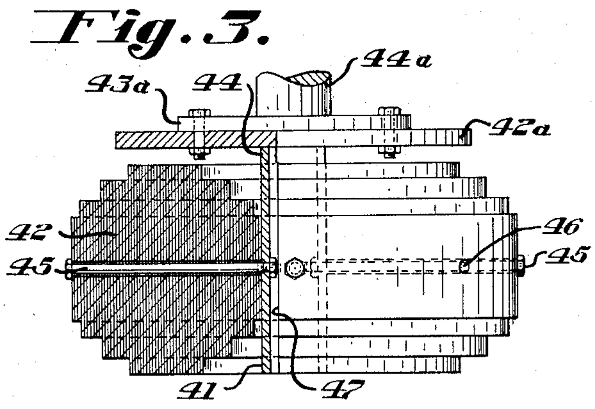
Figure 3 is a view, partly in cross section, taken along line III—III of Figure 2.

In order to construct the quadrantal corner sections 40 such as would be suitable for core 30, a width of ferromagnetic steel strip corresponding in width to the width of the innermost laminations 33 in the first step "A" of the cruciform cross section thereof, may have its end tack-welded to a hollow rectangular coiling mandrel 41. Mandrel 41 may be welded to a plate 42*a* adapted to be bolted to a flange plate 43*a* integral with the shaft 44*a* of a conventional coiling machine which is not illustrated. After winding enough of said width of strip to provide for that part of the four corner sections 40, which is to correspond to step "A," the strip is severed in a conventional manner and a second strip corresponding in width to the step "B" width may be tack-welded to the end of the prior length of strip coiled around mandrel 41. Subsequently appropriate lengths of strips of appropriate widths are sequentially coiled for steps "C," "D," "E," "F" and "G." The final end of the length of strip for forming step "G" may be tack-welded after it is severed, leaving mandrel 41 with a coil 42 of turns thereon as shown in Figure 1. Whenever a core made in accordance with this invention is of uniform width from edge to edge of the strip throughout, only a single width of strip of appropriate gauge and continuous length will be coiled about a mandrel such as mandrel 41.

Coil 42 may be then centrally drilled along the axis of its cardinal radii 43 and bolted respectively to the faces 44 of mandrel 41 by bolts 45. At the same time, holes 46 may be centrally drilled along a plane passing through the longitudinal axis of mandrel 41 and generally bisecting the angle between adjoining ones of the cardinal radii 43 because rectangular mandrel 41 in the illustration shown has a square cross section. These holes 46 lie along what may be called the four indexing planes or positions of the respective turns in coil 42. Such indexing plane positions may pass through each of the respective exterior corner edges of a rectangular mandrel which "crimp" or "bend" the coiled strip as it is wound.

After the fastening of coil 42 to mandrel 41 and the drilling of holes 46 along the indexing planes, plate 42*a* may be unbolted from plate 43*a* and coil 42 mounted adjacent a saw or cutter to sever the turns of coil 42 along the respective planes 47 parallel and adjacent to transverse planes through the respective cardinal radii 43. Usually the severance planes 47 where all of the turns are cut will be offset but relatively close to the respectively adjacent radius 43. In this way, all of the turns of coil 42 are converted into four quadrantal sections substantially identical to each other. In each section destined for a corner of a core of this invention, the distance along the strip making up the pieces in each section varies on the two sides of the indexing position or bend to predetermine the difference in length between the long and short sides respectively of the said pieces and eventually of the corner pieces. If a cylindrical mandrel is used with index positions drilled bisecting the cardinal radii, the severing of turns thereon may be made along a radial plane normal to the mandrel's surface.

Figure 4:
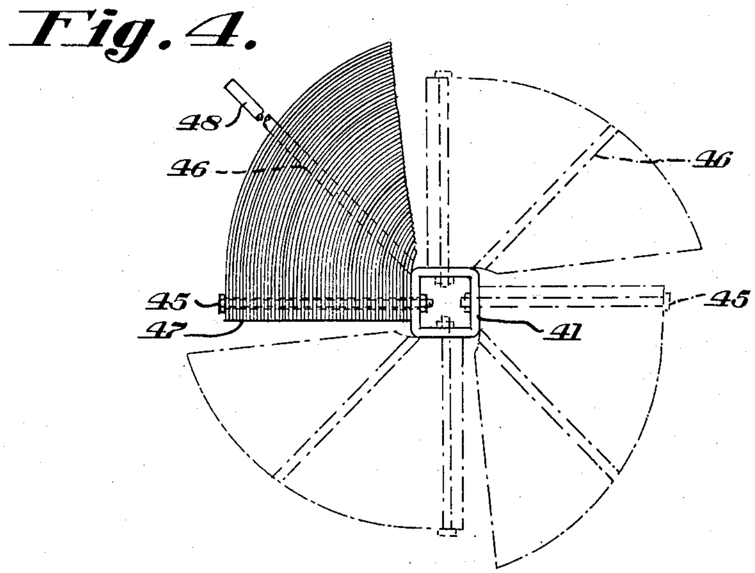
Figure 4 is a view in front elevation of the coil shown in Figure 2 after it has been cut into quadrantal sections.
Figure 5:
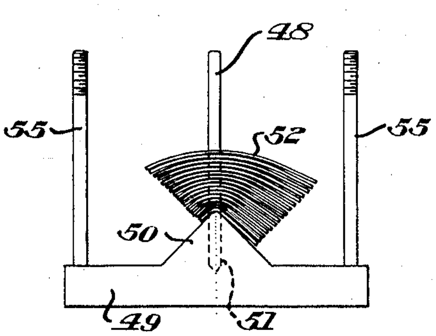
Figure 5 is a view in front elevation of an initial stacking step for such a quadrantal section.

Upon severance of the turns of coil 42 along the planes 47 there is sufficient elasticity in each of the pieces in each section to cause the sections to spring into the general form illustrated in Figure 4. Thereupon, a steel pin 48 may be shoved into hole 46 of the respective quadrantal sections to keep the pieces in each section in alignment while the respective bolt 45 holding said section to mandrel 41 is loosened and removed. Then the turns of the respective section on pin 48 can readily be transferred by a workman to a clamping and forming block 49 having a die portion 50 thereon. Pin 48 fits into a hole 51 in die portion 50 to keep the pieces of each section in vertical alignment on block 49 while permitting rotation of alternate pieces about the axis of pin 48.

Preferably, in the new cores of this invention, successive laminations will have the respective joints thereof staggered relative the joints of adjoining laminations. Under these circumstances, the pieces 52 from the respective quadrantal sections will have the alternate ones thereof rotated 180° about the axis of pin 48 relative to successive such pieces, bringing the partially shaped assemblage into the position shown in Figure 6 with the indexing plane or bend of the respective pieces rising directly and vertically above the apex of die portion 50 which has a dihedral angle between the sloping sides thereof equal to the approximate 90° angle desired as the included angle of the finally shaped and annealed pieces 52.

Figure 6:
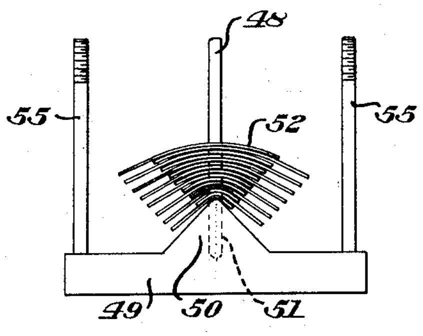
Figure 6 is a view in front elevation of a stacking position of the said quadrantal section subsequent to that shown in Figure 5.
Figure 7:
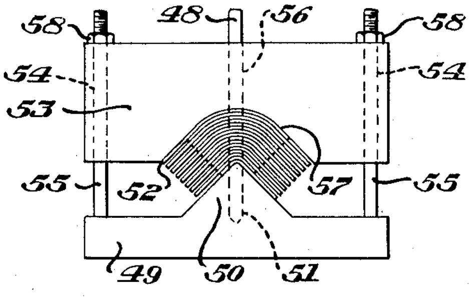
Figure 7 is a view in front elevation showing a mode of clamping and shaping the quadrantal section shown in Figure 6, preparatory to annealing.

An upper die block 53 may be placed over the pieces in the position shown in Figure 6 and has openings 54 therethrough which slide over clamping bolts 55 affixed to block 49 and a central drilled hole 56 which slides over pin 48. An upper die surface 57 is adapted to shape the outermost of the pieces 52 in each of the sections. By turning down on the nuts 58, block 53 clamps the pieces 52 against block 49 and die portion 50 giving them their final shape so that when annealed in conventional manner while so clamped, the pieces 52 are converted into preshaped corner pieces, such as the corner pieces suitable for employment in making core 30, with the electrical properties of the corner pieces restored by the annealing. Although the illustrations in the drawings show relatively few laminations, it is understood that this showing is but diagrammatic and that in actual practice the requisite number of pieces for the desired number of laminations in the final core will be coiled, shaped and annealed. Further, if desired, a jig may be used in place of pin 48 to align the bends of the respective pieces, such as pieces 52, over the apex of the die portion 50 in which case no holes corresponding to holes 46 will have to be drilled in the turns of the coiled strip.

In addition, in the assembling of each lamination and the strapping of the respective laminations, as in the case of core 30, the holes drilled along the cardinal radii 43 may be utilized for the passage of a bolt 34 making it unnecessary in such case to drill any additional holes through the corner pieces in order to achieve the necessary assemblage of the respective corner pieces and straight pieces in interlaminated arrangement as illustrated in Figure 10.

Figure 13:
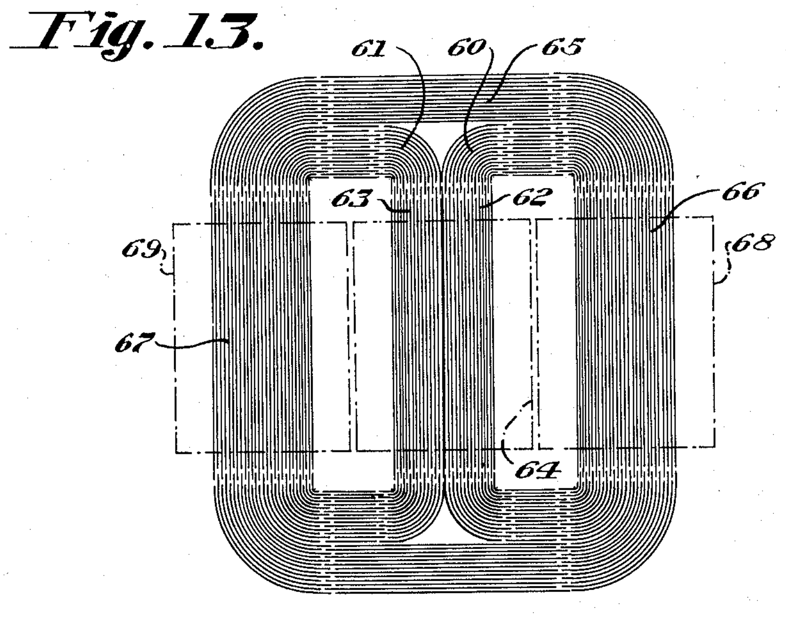
Figure 13 is an illustration of a modified core type three-phase transformer utilizing three cores made in accordance with this invention.

In the three-phase transformer embodiment illustrated in Figure 13, a plurality of the new cores made in accordance with this invention, may be employed. Thus, inner cores respectively numbered 60 and 61 may be placed side by side, the adjoining winding legs 62 and 63 of which may be linked with a single winding 64. Both cores 60 and 61 are enclosed within an exterior core 65 having winding legs 66 and 67. The legs 66 and 67 are respectively in side-by-side relation to the outer winding legs of the cores 60 and 61 for linkage again respectively with windings 68 and 69. It will be noted that the straight pieces in all of the winding legs of all of the cores may be of equal length as shown. Further, the corners of the cores 60 and 61 nesting with the respective corners of core 65 may be constructed, if desired, by the winding of a single coil by the mode generally illustrated in Figures 1 to 7. While the straight pieces in the yoke sides of cores 60 and 61 will generally be of the same length, the straight pieces in the yoke side of core 65 will be much longer as shown in Figure 13. Preferably, the corner pieces of the respective cores illustrated in the three-phase core assembly of Figure 13 will be asymmetrical in having one of the sides of each of the corner pieces longer than the other in the manner generally illustrated, for example, in Figure 9. Thus, in general, insulated bolting would be employed through the overlapping portions at the joints immediately at the ends of the straight pieces in legs 62 and 63. Similarly, there would be such insulated bolting at the other end of the corner pieces adjoining such straight pieces in legs 62 and 63. Wherever the joints in the cores 60 and 61 are in general alignment with the joints in core 65, the same insulated bolting means may be employed for the entire joints respectively so aligned. As will be well understood, the turns of the respective cores 60, 61 and 65 can be made of varying width of strip for respective steps to obtain any cruciform cross section that may be desired.

Figure 14:
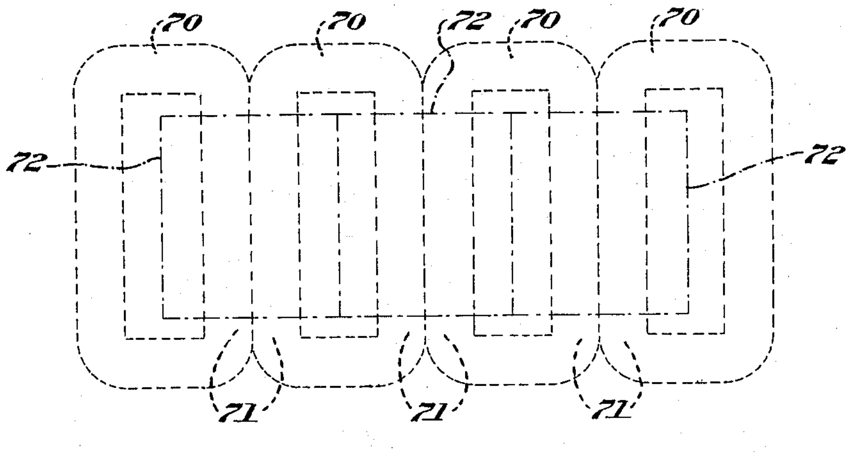
Figure 14 is a schematic view of a 5-legged core for a three-phase transformer which may be constructed employing four individual cores made in accordance with this invention.

In the Figure 14 diagrammatic embodiment, a plurality of individual new cores 70 may be constructed and placed in side-by-side relation to create a 5-legged core. The composite internal three legs 71 of the Figure 14 core may respectively be linked with at least three windings 72 to provide a three-phase core. As will be well understood, the windings illustrated in Figures 13 and 14 may be linked with the respective cores in the same manner as illustrated in the case of the embodiment shown in Figures 8 and 9.

Although one new mode of constructing the 90° corners employs a mandrel about which suitable strip is coiled, other modes of construction may be employed particularly where the new corner pieces are sharply angled as in the case of right-angled angles. Thus, corner pieces may be made as a part of the practice of this invention which are not begun by the coiling of strip on a mandrel. Instead, strip stamping or shearing and angle-forming means may be provided for that purpose. Corner pieces may be so made without departing from the teaching of the present invention.

Moreover, such corners may have alternate corner pieces with two longer sides while the alternate interleaved corner pieces in the same corner have two shorter sides. Then, the final new core assembly would have the longer-sided corner pieces respectively in the same lamination turn in diagonal corners with the shorter-sided corner pieces in the same lamination turn in the diagonal corners adjoining the longer-sided corner pieces.

Still further, although it is preferable in constructing new corner pieces in accordance with this invention to anneal them after any cutting or shearing operation is performed thereon, a higher loss level is permissible in higher rating transformers and the like, which in some cases will permit of annealing the corner pieces in their final shape before the cutting or shearing thereof is performed.

Various other modifications may be made in the details of this invention without departing from the spirit thereof or the scope of the appended claims.

We claim:

1. In a method of making a rectangular wound-type core for a transformer or the like, the steps comprising, winding and partially shaping a continuous strip of core steel into a coil, temporarily fastening said turns together radially substantially along each of four cardinal radii equally spaced apart circumferentially of said coil, indexing said turns generally along a plane generally bisecting the angle between adjoining ones of said cardinal radii, severing said turns along a plane generally parallel and adjacent to each of said cardinal radii but offset therefrom in the same direction and transverse to the longitudinal axis of said strip to form four quadrantal corner piece sections, and respectively turning alternate corner pieces in each of said quadrantal sections approximately 180° from their relative coil positions and shaping said pieces with their indexing positions in alignment to have an included angle of approximately ninety degrees.

2. In a method of making a rectangular wound-type core for a transformer or the like, the steps comprising, winding a continuous strip of core steel into a coil of generally rectangular form, temporarily fastening said turns together radially at four equally spaced apart points each of which is along one of the four sides of said quadrantal form, radially drilling an indexing hole through said turns along planes generally bisecting the angles between adjoining sides of said turns, cutting through all of said turns generally parallel to and somewhat offset in the same direction from each of said four points to form four quadrantal sections of corner pieces somewhat asymmetrical relative to said indexing holes, inserting a pin through the indexing hole in the pieces of each of said quadrants arranging successive pieces in each quadrant in staggered relation by turning alternate pieces 180° around the axis of said indexing hole to stagger the respective long and short sides thereof in successive pieces, and clamping and annealing the sections so arranged into nested corners having an included angle of approximately 90°, whereby any closed generally rectangular transformer core within a range of dimensions may be made therefrom by using respectively corresponding lengths of substantially straight strip between said corner strips appropriate to the core dimensions required.

3. In the method of constructing a rectangular wound-type magnetic core, the steps comprising winding magnetic strip flatwise to form a closed loop having a plurality of turns, radially drilling indexing holes through said turns at the midpoint of the width of the magnetic strip at four equally spaced apart points, radially cutting through said turns intermediate said indexing holes and offset in the same direction from the radius bisecting the angle between said indexing holes to provide four quadrantal sections of corner pieces, aligning the indexing holes of the pieces in each quadrantal section and turning alternate pieces 180° around the axis of said indexing holes to stagger the ends of adjacent pieces, shaping all of the pieces of each quadrantal section simultaneously to have an included angle of approximately 90 degrees, and annealing the pieces of each said section while so shaped, whereby closed rectangular magnetic cores of different dimensions having said quadrantal sections at the corners thereof may be constructed by interconnecting the quadrantal corner pieces with long straight flat laminations of magnetic material.

4. In the method of constructing a wound-type magnetic core, the steps comprising winding magnetic strip flatwise to form a closed convoluted loop, releasably fastening the convolutions of said loop together at four points equally spaced apart circumferentially, radially drilling indexing holes through the convolutions at the midpoint of the width of the magnetic strip and along planes generally bisecting the angle between adjacent ones of said points, radially cutting through said convolutions intermediate said indexing holes and offset in the same direction from said points to provide four quadrantal sections of corner pieces, aligning the indexing holes of the pieces in each quadrantal section and turning pieces in alternate lamination layers 180° from their relative wound positions to stagger the ends of adjacent pieces, clamping the pieces in each section with an approximately 90 degree bend therein and annealing the pieces while so bent, providing the four quadrantal sections at the corners of said magnetic core to be constructed, and interconnecting the pieces of said quadrantal sections with straight long flat laminations of magnetic material along the yokes and legs of said magnetic core.

5. In the method of constructing a rectangular magnetic core of the wound type, the steps comprising winding magnetic strip steel into a closed convoluted loop, indexing the convolutions of said loop at four points equally spaced apart circumferentially, cutting through said convolutions intermediate said four points and offset in the same direction from the radius bisecting the angle between said indexing points to form quadrantal sections of corner pieces, radially nesting the corner pieces in each of said sections in indexing alignment and with repetitively recurring pieces turned approximately 180° from their relative wound positions to stagger the ends of adjacent pieces, bending the pieces in each of said sections to have an included angle of approximately ninety degrees and annealing the pieces while so bent, whereby a closed transformer core having a range of heights and widths may be made therefrom.

6. In a method of constructing a wound-type rectangular magnetic core having straight strips in the legs thereof connected by corner pieces, the steps comprising, in combination, winding magnetic strip into a coil of generally quadrilateral form, releasably binding said turns together radially at four spaced apart points each of which is along one of the sides of said quadrilateral coil, radially drilling indexing holes through said turns at the midpoint of the width of said strip and substantially along the plane bisecting the angle at each corner of said quadrilateral form, cutting through all of said turns offset in the same direction from each of said points to form four quadrantal sections of corner pieces, inserting a pin in said indexing hole in each of said sections and turning the corner pieces in alternate lamination layers of said section through 180° around the axis of said indexing hole, clamping each section to shape said corner pieces thereof to include an angle of approximately 90°, and annealing said sections while so shaped to pre-set said corner pieces and to relieve strains in said magnetic strip, whereby a closed rectangular core within a range of dimensions may be made therefrom.

References Cited in the file of this patent

UNITED STATES PATENTS

| | | |
|---|---|---|
| 2,380,300 | Gaston | July 10, 1945 |
| 2,411,374 | Horstman | Nov. 19, 1946 |
| 2,446,999 | Camilli | Aug. 17, 1948 |
| 2,456,457 | Somerville | Dec. 14, 1948 |
| 2,456,459 | Somerville | Dec. 14, 1948 |
| 2,456,460 | Somerville | Dec. 14, 1948 |
| 2,456,461 | Dunn | Dec. 14, 1948 |
| 2,486,220 | Somerville | Oct. 25, 1949 |
| 2,523,071 | Somerville | Sept. 19, 1950 |
| 2,548,624 | Sclater | Apr. 10, 1951 |
| 2,558,110 | Stein | June 26, 1951 |
| 2,560,003 | Sealey | July 10, 1951 |
| 2,632,798 | Somerville | Mar. 24, 1953 |